W. H. FURNESS & C. E. VANDERKLEED.
WAVE MOTOR.
APPLICATION FILED NOV. 17, 1914.
1,259,845.
Patented Mar. 19, 1918.
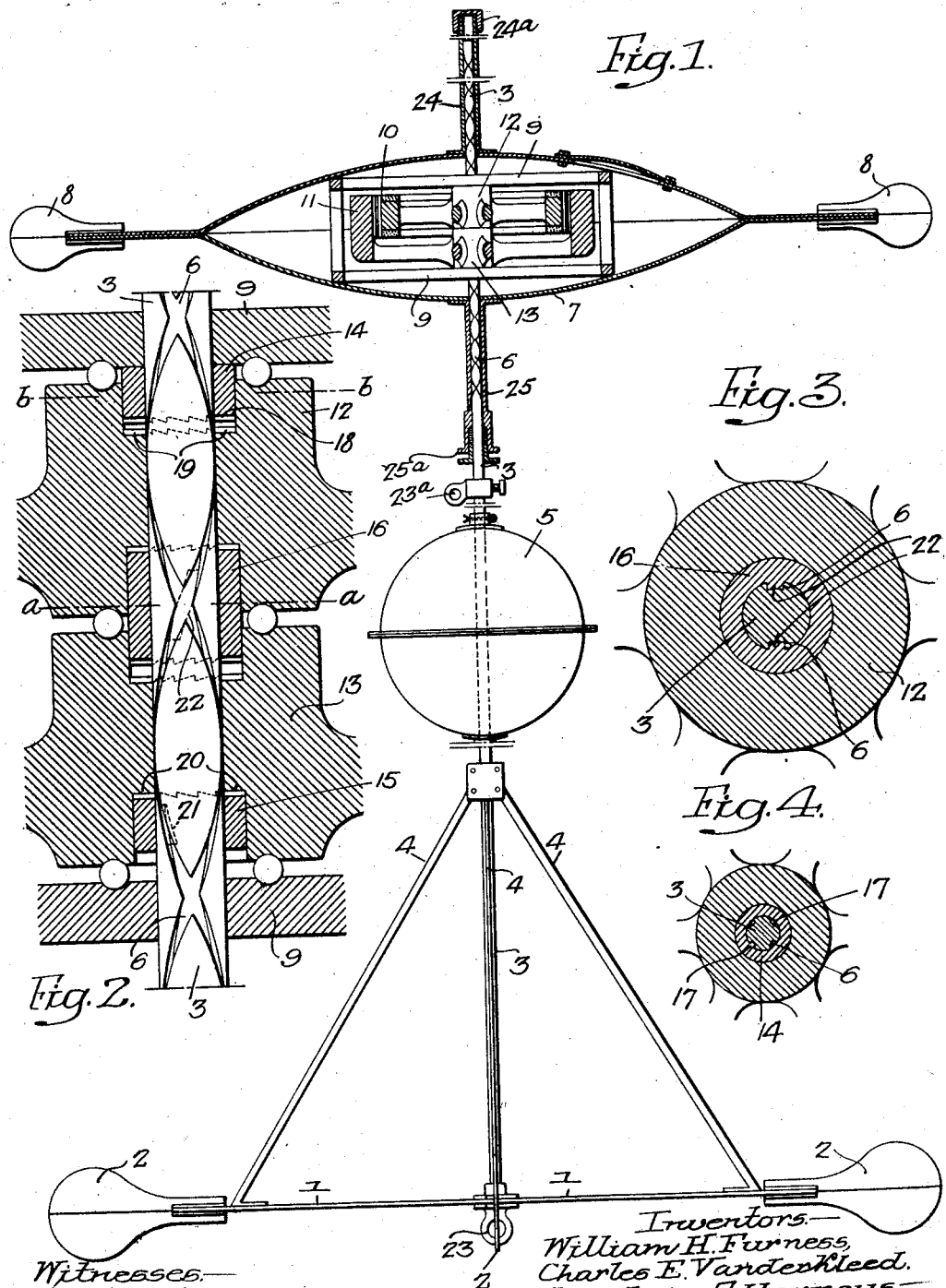
Inventors
William H. Furness,
Charles E. Vanderkleed.
by their Attorneys
Howson & Howson

UNITED STATES PATENT OFFICE.

WILLIAM H. FURNESS, OF NATIONAL PARK, AND CHARLES E. VANDERKLEED, OF COLLINGSWOOD, NEW JERSEY.

WAVE-MOTOR.

1,259,845.  Specification of Letters Patent.  Patented Mar. 19, 1918.

Application filed November 17, 1914. Serial No. 872,550.

*To all whom it may concern:*

Be it known that we, WILLIAM H. FURNESS and CHARLES E. VANDERKLEED, citizens of the United States, and residents, respectively, of National Park, Gloucester county, State of New Jersey, and Collingswood, Camden county, State of New Jersey, have invented certain Improvements in Wave-Motors, of which the following is a specification.

One object of our invention is to provide a relatively simple, substantial, efficient and inexpensive form of wave actuated machine whose parts shall be so arranged as to be capable of operation for extended periods of time without requiring any but a minimum of attention or repairs, the invention particularly contemplating a form of motor which may be installed and operated without requiring piers or other structures for its support or attachment, which shall be independent of tidal action and not liable to injury by storms.

A further object of our invention is to provide a form of wave motor which shall be especially adapted for use in the operation of pumping or electric plants of moderate capacity and which shall be of such design as to provide a support and in some cases, a protection for the machine which is to be driven.

We further desire to provide a wave motor which shall be capable of floating and operating in any body of water upon which waves of sufficient size are produced, and which may be conveniently anchored and held in any desired position without requiring expensive stationary structures.

These objects and other advantageous ends we secure as hereinafter set forth, reference being had to the accompanying drawings, in which, Figure 1 is a side elevation, partly in section, illustrating the preferred form of our wave motor;

Fig. 2 is a fragmentary vertical section on an enlarged scale illustrating one arrangement of clutches whereby power is transferred from the main float to the machine to be driven;

Fig. 3 is a horizontal section on the line *a—a*, Fig. 2, and,

Fig. 4 is a horizontal section on a reduced scale taken on the line *b—b*, Fig. 2.

In the above drawings 1 represents a stabilizing or anchor plate which in the present instance is of circular outline and is made of relatively thin suitably braced sheet metal having at its periphery or at other suitable points a number of vanes 2 projecting in planes at right angles to its plane for the purpose of preventing its rotation.

Projecting centrally from and rigidly fixed to this plate 1 is an elongated spindle or shaft 3 properly held or strengthened so as to project in a line at right angles to the plane of the plate by a suitable number of braces 4 extending from said shaft at an angle downwardly to the peripheral portions of the plate. This latter is designed to be floated in the water at such a distance below the surface thereof as to be practically unaffected by the rise and fall of the waves and for this purpose we mount on the shaft 3 a float 5 which in the present instance has the shape of a hollow sphere.

The upper end of the shaft 3 is formed or provided with any desired number of helical grooves 6 for a portion of its length equal to the distance through which a main float 7 is designed to be vertically moved by the waves, and said float consists of a hollow air tight structure, which while having a displacement sufficient to cause it to remain upon the surface of the water and rise and fall with the waves, has a relatively great weight. Like the stabilizing or anchor plate 1, this float may be provided with a suitable number of peripheral vanes 8 extending in planes at right angles to its general plane so that it also is prevented from rotation relatively to the other parts of the device. These vanes may be omitted without departing from our invention, since in some cases they are not required.

Mounted within this float in any suitable manner or if desired upon it, is the machine to be operated, which in the present instance is shown as a frame 9 supporting the two relatively rotatable members 10 and 11 of a dynamo-electric machine. Each of these members is mounted upon a series of spokes radiating from a hub and both of these hubs are slidable upon and rotatable relatively to the shaft 3, being so connected to the latter that they are turned thereby in opposite directions when they move down relatively thereto and continue to be driven in the same directions when they move up on said shaft. It is obvious that without departing from our invention the dynamo-electric machine may be mounted and driven in any other suitable manner.

For operating the generator we provide two single clutch members 14 and 15 and a double clutch member 16, of which the first consists of a sleeve having two keys or splines 17 extending into two oppositely placed helical grooves 6 of the shaft 3. This sleeve at one edge is provided with a series of teeth 18 designed to coöperate with a second series of teeth 19 formed in the bottom of a recess in the hub 12, the length of the sleeve being such that it is free to move in its recess longitudinally of the shaft 3, to bring its teeth into and out of engagement with said latter teeth.

Similarly the sleeve 15 is slidable longitudinally of the shaft within a recess in the hub 13 which likewise has teeth 20 at one edge designed to coöperate with the teeth at the bottom of said recess. This sleeve also has two keys indicated in dotted lines at 21, operative in two opposite helical grooves 6 other than those in which the keys of splines 17 move. The sleeve 16 is slidable longitudinally of the shaft 3 partly in a recess of the hub 12 and partly in a second recess of the adjacent hub 13, and the bottoms of both of these recesses are provided with teeth, as are also the respective ends of the sleeve 16 which, as shown in Fig. 2, has a pair of oppositely projecting keys or splines 22 operative within certain of the helical grooves 6 of the shaft 3.

The upper end of the shaft 3 is inclosed and protected by a sleeve 24 fixed to and projecting upwardly from the float 7, the downward movement of the latter on the shaft being limited by a cap 24ᵃ screwed on the end of said sleeve. Similarly, a second sleeve 25 is fixed to the under side of the float 7 and incloses the shaft 3 for a distance below the same, finally terminating in a stuffing box 25ᵃ whereby water is kept from the interior of the machine while relative movement of the sleeve and shaft is permitted.

If desirable, as when the apparatus is to be operated in a current, an anchor cable may be attached at a suitable point on the shaft 3 where the tendency of the device to tip will be a minimum, and for this purpose we provide a collar having a suitable eye 23ᵃ. At the center of the under side of the stabilizing or anchor plate 1 we may provide a second eye 23 for the reception of an anchor chain or cable though ordinarily this eye would not be required. Suitable terminals, commutator or collector rings, connections, etc., are provided for the dynamo-electric machine 10—11, as will be understood by those skilled in the electrical art, although these have been omitted from the drawings since their detail arrangement forms no part of the present invention.

The various parts are so mounted that when the machine is placed in a body of water, the float 5 is some distance below the surface thereof and maintains the stabilizing or anchor plate 1 at such a depth that the plane of the water surface intersects the shaft 3 at a point about midway between the top and bottom of its helically grooved portion;—the said plate being mounted at such a depth as to be practically undisturbed by the surface waves or at least to be moved out of time with them. Obviously the main float 7, will rise and fall with the waves, and under these conditions the shaft 3 will be practically stationary, being rigidly fixed to the stabilizing plate, which owing to its relatively great surface area, cannot move up or down except at a very slow rate.

As said float 7 starts to move upwardly with the body of water constituting the advancing slope of a wave, the sleeves 14, 15 and 16 lag behind owing to their engagement with the groove of the shaft 3, with the result that the teeth on the lower edges of the sleeves 14 and 16 engage respectively with the teeth of the upper recesses of the hubs 12 and 13, and since the keys of these two sleeves operate in oppositely running helical grooves, said hubs and with them the elements 10 and 11 of the dynamo-electric machine, are rotated in opposite directions. The sleeve 15 is inactive, since its teeth are not in engagement with the adjacent teeth of the hub 13. A driving force is transmitted to said elements as long as the float 7 moves upwardly relatively to the shaft and after having been once started the driven machine tends to continue in operation owing to the fly-wheel action of its elements.

After the passage of the crest of a wave the float 7 begins to fall and the sleeves 14 and 16 at once move out of engagement with the teeth of the upper recesses of the hubs, after which the teeth on the upper ends of the sleeves 15 and 16 engage the teeth in the lower recesses of said hubs as shown in Fig. 2. As a result the hubs again receive turning impulses owing to the longitudinal movement relatively to the shaft 3 of the sleeves clutched to them and while these turning impulses are opposite, they are respectively in the same directions as the impulses first imparted to said hubs, so that these together with the members attached to them, continue to turn as before indicated. While the upward movement of the main float 7 under the raising action of each wave tends to also raise the anchor plate 1, the large surface of the latter prevents an appreciable upward movement before said float is allowed to fall after the passage of the wave crest and the force exerted on the anchor plate is changed so that it tends to force down said plate.

Obviously the power available from such an apparatus as that described depends among other things upon the weight and dimensions of the float and its attached parts, the number of waves in a given interval of time, and the vertical distance through which the float moves, which in turn is dependent upon the amplitude of the waves.

By means of suitable apparatus, the current generated by the machine 10—11 may be utilized to charge a storage battery or to supply current to any desired electroreceptive devices on shore or on the machine itself, and any suitable apparatus may be employed to cut said battery or devices into and out of circuit, as required in view of fluctuations in the voltage due to variations in the relative speeds of the members 10 and 11. Any tendency of the float 7 or of the stabilizing plate 1 to rotate is prevented by the vanes 8 and 2 respectively, and where there is liability of the apparatus drifting it may be secured in position by a suitable anchor and cable attached to the eye 23ª.

A number of machines of the above described construction may be used with advantage to generate any required electric current, in which case a plant of a given capacity would be made up of a number of units, each of the maximum capacity for which this class of construction is particularly adapted. The current carrying conductors from the dynamo-electric machine would be led to any suitably placed electric receptive device through cables running from the float 7 and supported in any suitable manner either on floats or resting on the bottom.

We claim;

1. The combination in a wave motor of a vertical shaft; a float slidable thereon; mechanism including oppositely rotating members actuated by relative movement of the float and shaft; and a floating device for supporting the shaft; with means for preventing material longitudinal movement of said shaft.

2. The combination in a wave motor of a floating device including means for retarding vertical movement; a vertical shaft non-rotatably carried by said device; a float actuated by the waves; with mechanism carried by the float and including a rotary member operated by relative movement of the shaft and float.

3. The combination in a wave motor of a submerged floating structure; a vertical shaft non-rotatably supported thereby partly above the plane of the water surface; a float actuated by the waves and movable upon the shaft; with mechanism including a rotary member actuated by relative movement of the float and shaft.

4. The combination in a wave motor of a shaft; a float guided on said shaft so as to rise and fall with the waves; a submerged structure attached to the shaft and presenting a relatively great surface to oppose movement in the line of the shaft, a second float for supporting said structure; means for preventing rotation of the shaft; and mechanism including means for converting reciprocating into rotary motion, driven by the vertical reciprocating movement of the first float.

5. The combination in a wave motor of a shaft; a plate fixed to said shaft and extending in a plane at right angles to the line thereof; means for preventing rotation of the plate; a submerged float supporting the plate with a portion of the shaft above the surface of the water; a second float free to move on the shaft under the action of surface waves; and mechanism including a rotary member actuated by vertical movement of the second float on the shaft.

6. The combination in a wave motor of a helically grooved shaft; means for preventing rotation of the shaft; a submerged float supporting said shaft in a substantially vertical position partly out of water; a second float slidable on the shaft under the action of surface waves; means for preventing substantial longitudinal movement of the shaft as the second float moves thereon; with mechanism carried by said second float and including a member coöperating with the groove of the shaft to cause a rotary movement as the float moves up and down.

7. The combination in a wave motor of a helically grooved shaft; means for preventing rotation of the shaft; floating means for supporting said shaft partly out of the water; a surface float slidable on the shaft; a sleeve having a key coöperating with the groove of the shaft; mechanism rotatable relatively to the shaft; and a clutch for operatively connecting the sleeve and said mechanism when the float moves in one direction.

8. The combination in a wave motor of a shaft having a helical groove; means for supporting said shaft in the water with a portion normally above the surface thereof; a float guided on the shaft and free to rise and fall under the action of surface waves; a sleeve having a key operative in the groove of the shaft; two rotary members carried on the float; and means for clutching one of said members to the sleeve when the float moves in one direction and other means for clutching said sleeve to the second member when the float moves in the opposite direction.

9. The combination in a wave motor of a shaft; a plate attached to said shaft in position to retard longitudinal movement thereof; a float supporting said plate with the shaft partly submerged; a second float vertically slidable on the shaft; mechanism including a rotary member actuated by the rise and fall of the float on the shaft; and means for retarding rotation of the plate.

10. The combination in a wave motor of a shaft; a plate attached to said shaft in position to retard longitudinal movement thereof; a float supporting said plate with the shaft partly submerged; a surface float vertically slidable on the shaft; mechanism including a rotary member actuated by the rise and fall of the float on the shaft; and means for preventing material rotation of the plate.

11. The combination in a wave motor of a shaft; a plate attached to said shaft in position to retard longitudinal movement thereof; a float supporting said plate with the shaft partly submerged; a surface float vertically slidable on the shaft; mechanism including a rotary member actuated by the rise and fall of the float on the shaft; and a series of vanes mounted on said plate for retarding rotation thereof.

12. The combination in a wave motor of a shaft having a helical groove; means for preventing rotation of the shaft; a plate attached to said shaft; a submerged float attached to said plate and shaft for supporting the latter in a position partly out of water; a surface float slidably guided on the shaft; mechanism including a rotary member having a key operative in the groove of the shaft; and means for preventing relative rotation of the surface float and the plate.

13. The combination in a wave motor of a shaft having a plurality of helical grooves; means for supporting said shaft in a position partly out of water; means for retarding longitudinal movement of the shaft; a float slidable on the shaft; driven mechanism including two oppositely rotatable members; a plurality of sleeves operative on the shaft and having keys respectively operative in the grooves thereof; and clutch teeth formed respectively on the sleeves and on the adjacent portions of said rotatable members in positions to cause each up or down movement of the surface float to drive the rotary members in opposite directions.

In testimony whereof, we have signed our names to this specification, in the presence of two subscribing witnesses.

WILLIAM H. FURNESS.
CHARLES E. VANDERKLEED.

Witnesses:
  Jos. H. KLEIN,
  WILLIAM E. BRADLEY.

Copies of this patent may be obtained for five cents each, by addressing the "Commissioner of Patents, Washington, D. C."